United States Patent
Reyes et al.

(10) Patent No.: US 9,745,504 B2
(45) Date of Patent: *Aug. 29, 2017

(54) WELLBORE SERVICING COMPOSITIONS AND METHODS OF MAKING AND USING SAME

(71) Applicant: Halliburton Energy Services, Inc., Houston, TX (US)

(72) Inventors: Enrique Antonio Reyes, Tomball, TX (US); Aaron M. Beuterbaugh, Spring, TX (US); Alyssa Lynn Smith, Humble, TX (US); B. Raghava Reddy, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/848,407

(22) Filed: Mar. 21, 2013

(65) Prior Publication Data

US 2014/0287968 A1 Sep. 25, 2014

(51) Int. Cl.
*C09K 8/528* (2006.01)

(52) U.S. Cl.
CPC .................... *C09K 8/528* (2013.01)

(58) Field of Classification Search
CPC . C09K 8/72; C09K 8/528; C09K 8/62; C09K 17/14; C09K 17/40; C09K 3/1463; C09K 3/22; C09K 8/5083; C09K 8/512; C09K 8/514; C09K 8/584; C09K 8/685; C09K 8/74; C09K 8/882; C09K 8/887; C09K 8/09; C09K 2208/00; C09K 2208/22; C09K 2208/24; C09K 8/42; C09K 8/506; C09K 8/52; C09K 8/524; C09K 8/532; C09K 8/536; C09K 8/54; C09K 8/582; C09K 8/605; C09K 8/66; C09K 8/70; C09K 8/80; E21B 37/06; E21B 43/26; E21B 33/138; E21B 43/04; E21B 43/18; E21B 43/25; E21B 43/283
See application file for complete search history.

(56) References Cited

U.S. PATENT DOCUMENTS

| | | | |
|---|---|---|---|
| 3,077,454 A | 2/1963 | Monroe et al. | |
| 4,190,462 A * | 2/1980 | De Jong | C09K 8/528 134/2 |
| 4,765,913 A | 8/1988 | Featherstone | |
| 5,697,443 A | 12/1997 | Brezinski et al. | |
| 5,783,524 A | 7/1998 | Greindl et al. | |
| 6,093,849 A | 7/2000 | Aksela et al. | |
| 6,436,880 B1 | 8/2002 | Frenier | |
| 6,590,120 B1 | 7/2003 | Aksela et al. | |
| 6,924,255 B2 | 8/2005 | Chang et al. | |
| 7,470,330 B2 | 12/2008 | Keatch | |
| 7,621,334 B2 | 11/2009 | Welton et al. | |
| 7,906,464 B2 | 3/2011 | Davidson | |
| 7,992,656 B2 | 8/2011 | Dusterhoft et al. | |
| 8,066,846 B2 | 11/2011 | Parén et al. | |
| 8,071,511 B2 | 12/2011 | Welton et al. | |
| 8,361,937 B2 | 1/2013 | Cassidy et al. | |
| 2002/0070022 A1* | 6/2002 | Chang | C09K 8/72 166/305.1 |
| 2008/0277112 A1 | 11/2008 | Welton et al. | |
| 2010/0276152 A1* | 11/2010 | De Wolf | C09K 8/74 166/308.2 |
| 2012/0097392 A1* | 4/2012 | Reyes | C02F 5/12 166/279 |
| 2012/0115759 A1* | 5/2012 | Reyes | C09K 8/524 507/241 |
| 2012/0145401 A1 | 6/2012 | Reyes | |

(Continued)

FOREIGN PATENT DOCUMENTS

| WO | 2005064074 A2 | 7/2005 |
|---|---|---|
| WO | WO 2005/064074 * | 7/2005 |

(Continued)

OTHER PUBLICATIONS

Hyvonen, H, Aksela, R, Complexation of N-bis[2-(1,2-dicarboxyethoxy)ethyl]aspartic acid with Fe(II), Co(II), and Ni(II) in aqueous solution, Journal of Coordination Chemistry, 2009, 62, 3875-3884.*
Hyvonen, H, Aksela, R, Complexation of [S,S,S]- and [R,S,R]-isomers of N-bis[2-(1,2-dicarboxyethoxy)ethyl] aspartic acid with Mg(II), Ca(II), Mn(II), Fe(III), Cu(II) and Zn(II) ions in aqueous solution, Journal of Coordination Chemistry, 2008, 61, 2515-2527.*
Scifinder document downloaded on 3/29/19.*
ACS Appl. Mater. Interfaces DOI: 10.1021/acsami.6b10832 downloaded on Oct. 2, 2016.*
Oilfiled Review downloaded on Oct. 2, 2016.*
Hyvonen, H, Aksela, R, Complexation of N-bis[2-(1,2-dicarboxyethoxy)ethyl]aspartic acid with Fe(II), Co(II), and Ni(II)in aqueous solution, Journal of Coordination Chemistry, 2009, 62, 3875-3884.*

(Continued)

*Primary Examiner* — Kumar R Bhushan
(74) *Attorney, Agent, or Firm* — Craig W. Roddy; Baker Botts L.L.P.

(57) ABSTRACT

A method of servicing a wellbore in a subterranean formation comprising preparing a wellbore servicing fluid comprising an amino polyether multicarboxylic acid chelating agent and/or an amino polyether multicarboxylic acid chelating agent precursor, and an aqueous base fluid, and contacting the wellbore servicing fluid with scale deposits on a surface in the wellbore and/or subterranean formation. A method of servicing a wellbore in a subterranean formation comprising preparing a wellbore servicing fluid comprising an amino polyether multicarboxylic chelating agent precursor and an aqueous base fluid, and contacting the wellbore servicing fluid with scale deposits on a surface in the wellbore and/or subterranean formation. A scale-removing wellbore servicing fluid comprising an amino polyether multicarboxylic acid chelating agent and/or an amino polyether multicarboxylic acid chelating agent precursor, and an aqueous base fluid.

10 Claims, No Drawings

(56) References Cited

U.S. PATENT DOCUMENTS

2012/0172263 A1 7/2012 Reyes et al.
2012/0202720 A1 8/2012 de Wolf et al.
2012/0238479 A1 9/2012 Choudhary et al.

FOREIGN PATENT DOCUMENTS

| WO | WO2005/064074 | * | 7/2005 |
|---|---|---|---|
| WO | 2007104054 A1 | | 9/2007 |
| WO | 2009086954 A1 | | 7/2009 |
| WO | 2009137399 A2 | | 11/2009 |
| WO | 2010053904 A2 | | 5/2010 |
| WO | 2010056779 A2 | | 5/2010 |
| WO | 2012080297 A1 | | 6/2012 |
| WO | 2012080463 A1 | | 6/2012 |
| WO | 2012113738 A1 | | 8/2012 |
| WO | 2012116032 A1 | | 8/2012 |

OTHER PUBLICATIONS

Foreign communication from a related counterpart application—International Search Report and Written Opinion, PCT/US2014/020288, May 14, 2014, 10 pages.

Foreign communication from a related counterpart application—International Search Report and Written Opinion, PCT/US2014/031583, May 14, 2014, 11 pages.

Aboud, Ricardo, et al., "Effective Matrix Acidizing in High-Temperature Environments," SPE109818, 2007, pp. 1-10, Society of Petroleum Engineers.

Bagci, Suat, "The Effect of Fractures on the Steam-Assisted Gravity Drainage Process," Energy & Fuels, 2004, pp. 1656-1664, vol. 18, No. 6, American Chemical Society.

Boethling, R. S., et al., "Designing Small Molecules for Biodegradability," Chem. Rev., 2007, pp. 2207-2227, vol. 107, No. 6, American Chemical Society.

Filing receipt and specification for patent application entitled "Removal of Inorganic Deposition from High Temperature Formations with Non-Corrosive Acidic pH Fluids," by Enrique Antonio Reyes, et al., filed Mar. 28, 2013 as U.S. Appl. No. 13/852,710.

Hancock, Robert D., et al., "Ligand Design for Selective Complexation of Metal Ions in Aqueous Solution," Chem. Rev., 1989, pp. 1875-1914, vol. 89, No. 8, American Chemical Society.

Hyvönen, Helena, "Studies on Metal Complex Formation of Environmentally Friendly Aminopolycarboxylate Chelating Agents," 2008, pp. 1-94, University of Helsinki, Finland.

Katata, L., et al., "Determination of Ethylenediaminetetraacetic Acid, Ethylenediaminedisuccinic Acid and Iminodisuccinic Acid in Cosmetic Products by Capillary Electrophoresis and High Performance Liquid Chromatography," Analytica Chimica Acta, 2006, pp. 177-184, vol. 579, Elsevier B.V.

Ko•Ody Ńska, Dorota, "Iminodisuccinic Acid as a New Complexing Agent for Removal of Heavy Metal Ions from Industrial Effluents," Chemical Engineering Journal, 2009, pp. 277-288, vol. 152, Elsevier.

McClatchie, D.W., "The Removal of Hard Scales from Geothermal Wells: California Case Histories," SPE 60723, 2000, pp. 1-7, Society of Petroleum Engineers, Inc.

Metsärinne, Sirpa, et al., "Determination of Novel Complexing Agents in Pulp and Paper Mill Effluents and in Lake Water by Liquid Chromatography," Journal of Chromatography A, 2005, pp. 56-59, vol. 1094, Elsevier.

Nowack, Bernd, "Environmental Chemistry of Aminopolycarboxylate Chelating Agents," Environmental Science & Technology, 2002, pp. 4009-4016, vol. 36, No. 19, American Chemical Society.

Phillips, Sidney L., et al., "A Survey of Treatment Methods for Geothermal Fluids," SPE 6606, Society of Petroleum Engineers of AIME, 1976, pp. 187-194 plus 2 pages of Tables, American Institute of Mining, Metallurgical, and Petroleum Engineers, Inc.

Rahman, M. Azizur, et al., "Hydroxyiminodisuccinic Acid (HIDS): A Novel Biodegradable Chelating Ligand for the Increase of Iron Bioavailability and Arsenic Phytoextraction," Chemosphere, 2009, pp. 207-213, vol. 77, Elsevier Ltd.

Tandy, Susan, et al., "Extraction of Heavy Metals from Soils Using Biodegradable Chelating Agents," Environmental Science & Technology, 2004, pp. 937-944, vol. 38, No. 3, American Chemical Society.

Tsang, Daniel C. W., et al., "Kinetic Interactions of EDDS with Soils. 2. Metal-EDDS Complexes in Uncontaminated and Metal-Contaminated Soils," Environmental Science & Technology, 2009, pp. 837-842, vol. 43, No. 3, American Chemical Society.

Wajima, Takaaki, et al., "Treatment of Geothermal Water from Geothermal Plant Using Hydrotalcite for Removal of Harmful Anions," Abstract, Jun. 2009, p. 263, Proceedings of the Nineteenth International Offshore and Polar Engineering Conference, Osaka, Japan, International Society of Offshore and Polar Engineers (ISOPE).

Whitburn, Joanne S., et al. "Chemical Speciation of Ethylenediamine-N-N'-Disuccinic Acid (EDDS) and Its Metal Complexes in Solution," Chemical Speciation and Bioavailability, 1999, pp. 85-93, vol. 11, No. 3.

International Preliminary Report on Patentability issued in related PCT Application No. PCT/US2014020288 mailed Oct. 1, 2015 (9 pages).

McMurry John. Organic Chemistry. Monterey: Brooks/Cole, (1984), 42-44; 606.

Venn, R. F. Principles and practice of bioanalysis. London, New York (2000), 1-27.

De Wolf, C. A., et al. "Evaluation of environmentally friendly chelating agents for applications in the oil and gas industry." SPE International Symposium and Exhibition on Formation Damage Control. Society of Petroleum Engineers, 2014.

* cited by examiner

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to methods of treating a wellbore to remove mineral scale deposits.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

During the drilling operation, a drilling fluid, also referred to as drilling mud, is conventionally circulated through the wellbore as the borehole is drilled. The presence of such a drilling mud aids in the drilling operation, for example, by removing cuttings from the wellbore, (e.g., by suspending and releasing cuttings returned to the surface), controlling pressures within the subterranean formation, sealing permeable and/or semi-permeable portions of the subterranean formation, stabilizing the subterranean formation, cooling and lubricating the drilling apparatus, and facilitating completion operations. At the end of the drilling operation, in order to transition to the completion operation, a wellbore cleaning operation is typically performed, as any debris such as drilling mud and metal solids left in the wellbore can have an adverse effect on several aspects of a wellbore's completion and production stages, from inhibiting the performance of downhole tools to inducing formation damage and plugging of equipment. For example, mineral scale accumulations or deposits have to be removed from the pipes and casing prior to wellbore completion.

During the production stage, scale can develop in formation pores near the wellbore, and it can reduce the porosity and permeability of the formation. Whenever the wellbore produces water, or when water injection is used to enhance the recovery of the natural resource, there is always the possibility that scale will form. Scale may block flow of the natural resources by clogging perforations or forming a thick lining in the production tubing. Scale can also coat and damage wellbore equipment, such as safety valves, casings, production tubing, mandrels, pipes, separators, pumps, etc. If the scale is not removed, the wellbore capacity production can diminish drastically, and in some cases scale deposits can cause the wellbore production to be shut down for a period of time. As such, scale deposits may be removed to allow the unimpeded flow of natural resources through the wellbore. Some scales, such as calcium carbonate scales for example, can be removed by dissolution with acids, which can have corrosive effects on the wellbore equipment and may damage the formation. Other scales, such as barium sulfate scales for example, however, are resistant to conventional acid dissolution treatments. Scale removal by acids, when effective, may sometimes lead to the re-precipitation or re-deposition of the scale on surfaces. One way to circumvent this problem is by using chelating agents to chelate the metal ions from the mineral scale deposits. A variety of chelating agents are commonly used for scale removal in wellbore operation procedures, however, these conventional chelating agents have very low biodegradability and tend to accumulate in the environment. Thus, an ongoing need exists for more effective compositions and methods of removing mineral scale deposits in subterranean formations and/or equipment associated with the wellbore.

SUMMARY

Disclosed herein is a method of servicing a wellbore in a subterranean formation comprising preparing a wellbore servicing fluid comprising an amino polyether multicarboxylic acid chelating agent and/or an amino polyether multicarboxylic acid chelating agent precursor, and an aqueous base fluid, and contacting the wellbore servicing fluid with scale deposits on a surface in the wellbore and/or subterranean formation.

Also disclosed herein is a method of servicing a wellbore in a subterranean formation comprising preparing a wellbore servicing fluid comprising an amino polyether multicarboxylic chelating agent precursor and an aqueous base fluid, and contacting the wellbore servicing fluid with scale deposits on a surface in the wellbore and/or subterranean formation.

Further disclosed herein is a scale-removing wellbore servicing fluid comprising an amino polyether multicarboxylic acid chelating agent and/or an amino polyether multicarboxylic acid chelating agent precursor, and an aqueous base fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing compositions comprising a chelating agent and/or a chelating agent precursor, and an aqueous base fluid. In an embodiment, the composition may be used for the removal of mineral scale deposits/accumulations or scale from the formation. In some embodiments, the composition may be used for the removal of scale from the wellbore equipment surfaces. In other embodiments, the composition may be used for the removal of scale from any surfaces that might come in contact with a produced natural resource (e.g., oil). Hereinafter, the disclosure will refer to the use of compositions for the removal of a scale deposit from a surface (e.g., geological surface) or artificially placed or deliberately introduced materials (e.g., equipment) whose surface is also prone to scale deposition, in a subterranean formation, designated a CORS, although the removal of scale from other surfaces of the type disclosed herein is also contemplated. The CORSs may be placed downhole and used to service a wellbore, for example providing for time-delayed removal of scale from the wellbore. Each of the components of the CORS as well as methods of using same will be described in more detail herein.

In an embodiment, the CORS comprises a chelating agent. Without wishing to be limited by theory, a chelating agent or chelant is a chemical compound that forms soluble, complex molecules, i.e., "chelates," with certain metal ions, inactivating the ions so that they cannot normally react with other elements or ions to produce scale or precipitates. The process by which chelates form as a result of the interaction between chelating agents and metal ions, for example, is termed chelation. Further, without wishing to be limited by theory, chelation represents the formation or presence of two or more bonds (or other attractive interactions), which are generally termed coordinate bonds, between two or more separate binding sites, which are generally termed coordination sites or chelation sites, within the same ligand and a single central metal atom. A ligand with two or more coordination sites can be generally described as bidentate or didentate (for two coordination sites), tridentate (for three coordination sites), tetradentate (for four coordination sites), pentadentate (for five coordination sites) and so on, or polydentate or multidentate (for multiple coordination sites).

In an embodiment, a chelating agent suitable for use in the present disclosure comprises an amino polyether compound characterized by Structure I comprising one nitrogen atom and at least 5 chelation sites (e.g., pentadentate ligand):

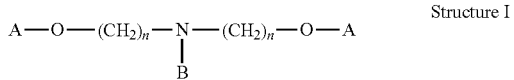

Structure I where the repeating methylene (—CH$_2$—) unit may occur n times with the value of n ranging from about 1 to about 10, alternatively from about 1 to about 5, or alternatively from about 2 to about 4; A and B can each independently be hydrogen, a C$_1$-C$_4$ alkyl group, a carboxylic acid containing moiety, —CH$_2$—COOH,

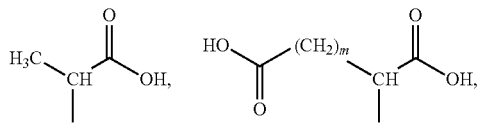

where the repeating methylene (—CH2—) unit may occur m times with the value of m ranging from about 1 to about 6, alternatively from about 1 to about 4, or alternatively from about 2 to about 3. For purposes of the disclosure herein, the chelation sites of the amino polyether compound characterized by Structure I include carboxyl and/or carboxylate groups, ether and amino groups.

In an embodiment, the chelating agent characterized by Structure I comprises an amino polyether multicarboxylic acid and/or an amino polyether multicarboxylate. For purposes of the disclosure herein the amino polyether multicarboxylic acid can be referred to as a multicarboxylic acid, and the amino polyether multicarboxylate can be referred to as a multicarboxylate. Without wishing to be limited by theory, a multicarboxylic acid has a pK$_a$ (acid dissociation logarithmic constant) value for each of its carboxylic acid functions; in the case of a multicarboxilic acid, two or more of its pK$_a$ values may be the same, or all pK$_a$ values may be different from each other. In an embodiment, a multicarboxylic acid suitable for use as a chelating agent in the present disclosure has pK$_a$ values in the range of from about 1 to about 12, alternatively from about 2 to about 11, or alternatively from about 2 to about 10. Further, without wishing to be limited by theory, when a multicarboxylic acid has multiple pK$_a$ values, there are some pH values where some of the carboxylic acid groups will be protonated (i.e., —COOH), and some other carboxylic acid groups will be in the anionic carboxylate form (i.e., —COO$^-$). For example, if the multicarboxylic acid is a dicarboxylic acid and the two carboxylic acid groups have a pKa$_1$ of 2 and a pKa$_2$ of 8, when the dicarboxylic acid is in a solution that has a pH above the pKa$_2$ of 8, both carboxylic acid groups are in the anionic carboxylate form (i.e., —COO$^-$); when the dicarboxylic acid is in a solution that has a pH below the pKa$_1$ of 2, both carboxylic acid groups are in the protonated form (i.e., —COOH); and when the dicarboxylic acid is in a solution that has a pH between the pKa$_1$ of 2 and the a pKa$_2$ of 8, the carboxylic acid group with a pKa$_1$ of 2 will be in the anionic carboxylate form (i.e., —COO$^-$), and the carboxylic acid group with a pKa$_2$ of 8 will be in the protonated form (i.e., —COOH). In an embodiment, a carboxylic or multicarboxylic acid ligand chelates metal ions preferentially when the carboxylic or multicarboxylic acid ligand is in the anionic carboxylate form (i.e., —COO$^-$).

Nonlimiting examples of multicarboxylic acids suitable for use as chelating agents in the present disclosure include N-tris[2-(1,2-dicarboxyethoxy)ethyl] amine (i.e., TCA6 characterized by Structure II), N-bis[2-(carboxymethoxy)ethyl]glycine (i.e., BCA3 characterized by Structure III), N-bis[2-(1,2-dicarboxyethoxy)ethyl]glycine (i.e., BCA5 characterized by Structure IV), N-bis[2-(1,2-dicarboxyethoxy)ethyl]aspartic acid (i.e., BCA6 characterized by Structure V), N-bis[2-(methylcarboxymethoxy)ethyl]glycine (i.e., MBCA3 characterized by Structure VI), N-bis[2-(1,2-dicarboxyethoxy)ethyl]methylglycine (i.e., MBCA5 characterized by Structure VII), or any combinations thereof Structure II

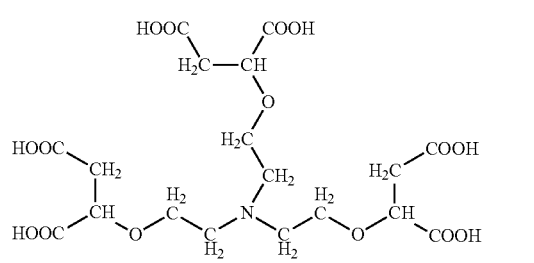

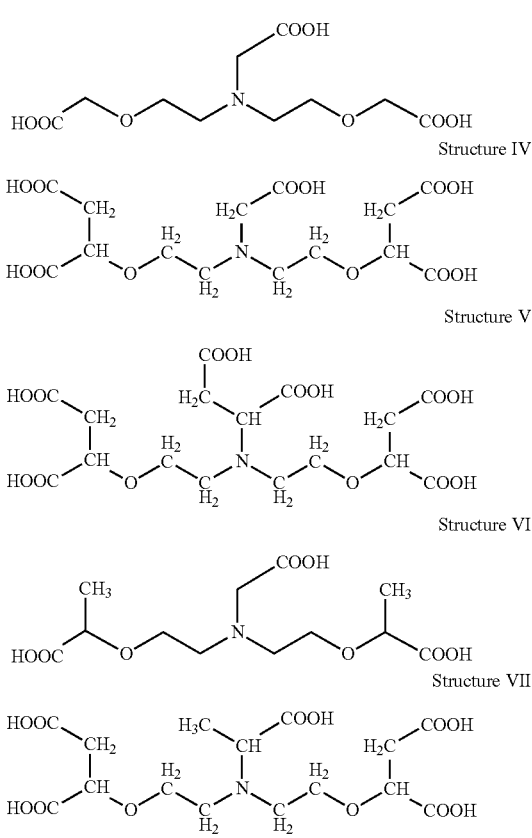

In an embodiment, a chelating agent suitable for use in the present disclosure may have a complexation constant for complexation reactions with metal ions typically involved in scale formations (e.g., $Ca^{2+}$, $Mg^{2+}$, $Ba^{2+}$, $Fe^{3+}$, etc.) in the range of from about 1 to about 40, alternatively from about 10 to about 35, or alternatively from about 12 to about 25. Without wishing to be limited by theory, the complexation constant or stability constant of a chelating agent is the logarithm of an equilibrium constant which indicates the stability of the complexes formed by the chelating agent. The larger the value of the complexation constant, the more stable the complex formed by the chelating agent with a particular ion, the better the chelating agent for chelating such particular ion. Generally, the reported complexation constant is normally determined for the fully deprotonated form of the molecule (e.g., chelating agent molecule), which relates/corresponds to the ability of the molecule (e.g., chelating agent molecule) to chelate a cation (e.g., metal ion). The complexation constant is dependent upon a variety of parameters, out of which temperature influences the most the value of the complexation constant. Furthermore, the reported complexation constant is typically measured at room temperature. Moreover, the formation of a complex is known to occur in the pH range comprising the different $pK_a$ values associated with the different functional groups (e.g., carboxylate groups, amino groups, sulfonate moieties) of the molecule (e.g., chelating agent molecule), and such complex has a "conditional" (complexation/formation/stability) constant associated with it, which conditional constant is reported for a particular pH value. It is this latter characteristic (e.g., the presence of multiple functional groups within the same chelating agent molecule) that makes the use of chelating agents of the type disclosed herein relevant. For purposes of the disclosure herein, it is desirable for the chelating agent molecule to have a multitude of functional groups comprising protic moieties with $pK_a$ values in the acidic range (e.g., from about 0 to about 5), because this increases the stabilizing mechanisms (e.g., complexation) that can maintain cations (e.g., metal ions) in a soluble state even when cation (e.g., metal ion) concentration is above cation (e.g., metal ion) saturation concentration value for a particular solution.

In an embodiment, a chelating agent suitable for use in the present disclosure may be used in an environment that has a pH value of less than about 8, alternatively from about 1 to about 8, alternatively from about 1 to about 5, or alternatively from about 1 to about 3.

In an embodiment, the chelating agent may be included within the CORS in a suitable or effective amount (e.g., an amount effective to reduce/eliminate a desired amount of scale from a surface). The resultant concentration and/or amount of chelating agent that is necessary may be dependent upon a variety of factors such as the composition of the aqueous base fluid, the presence or absence of various additives; the composition of the scale; the thickness of the scale; the temperature of the operational environment (e.g., the wellbore); the composition of the formation, the pressure of the formation, the diameter of the hole, the particular chelating agent used, the expected contact time of the chelating agent with the formation; the desired amount of time necessary for removal of the scale; or combinations thereof. In an embodiment, a chelating agent of the type disclosed herein may be present within the CORS in an amount of from about 1 wt. % to about 50 wt. %, alternatively from about 5 wt. % to about 25 wt. %, or alternatively from about 10 wt. % to about 20 wt. %, based on the total weight of the CORS.

In an embodiment, the CORS comprises a chelating agent precursor. Herein a chelating agent precursor is defined as a material or combination of materials that provides for delayed release of one or more carboxylic acid (e.g., —COOH) and/or carboxylate (e.g., —COO⁻) species. Such chelating agent precursors may also be referred to as time-delayed and/or time-released chelating agents. Chelating agent precursors suitable for use in this disclosure may comprise a material or combination of materials that react to generate and/or liberate a chelating agent after a period of time has elapsed. The liberation of the carboxylic acid (e.g., —COOH) and/or carboxylate (e.g., —COO⁻) species from the chelating agent precursor may be accomplished through any means known to one of ordinary skill in the art with the benefits of this disclosure and compatible with the user-desired applications. In embodiments, chelating agent precursors may be formed by modifying chelating agents via the addition of an operable functionality or substituent, physical encapsulation or packaging, or combinations thereof. The operable functionality and/or substituent may be acted upon in any fashion (e.g., chemically, physically, thermally, etc.) and under any conditions compatible with the process in order to release the chelating agent at a desired time and/or under desired conditions such as in situ wellbore conditions. In an embodiment, the chelating agent precursor comprises at least one modified carboxylic acid functionality such that when acted upon and/or in response to pre-defined conditions (e.g., in situ wellbore conditions such as temperature, pressure, chemical environment, pH changes, etc.), a chelating agent (e.g., carboxylic acid (e.g., —COOH) and/or carboxylate (e.g., —COO⁻) species) is released. In an embodiment, the chelating agent precursor may comprise carboxylic acid (e.g., —COOH) and/or carboxylate (e.g., —COO⁻) species that are released after exposure of the chelating agent precursor compounds to an elevated temperature such as a wellbore temperature (e.g., from about 100° C. to about 130° C.). In an embodiment, the chelating agent precursor comprises a material which reacts with one or more components of the CORS (e.g., reacts with an aqueous fluid present in the CORS) to liberate at least one carboxylic acid (e.g., —COOH) and/or carboxylate (e.g., —COO⁻) species. In an embodiment, the chelating agent precursor comprises a material which reacts with one or more compounds present within the wellbore and/or surrounding formation (e.g., reacts with an aqueous fluid present in situ within the wellbore and/or surrounding formation, for example a naturally occurring aqueous formation fluid) to liberate at least one carboxylic acid (e.g., —COOH) and/or carboxylate (e.g., —COO⁻) species. In an embodiment, the chelating agent precursor comprises a material which reacts with one or more components of the CORS (e.g., an aqueous fluid present in the CORS) or of wellbore fluids (e.g., a formation fluid) to liberate at least one carboxylic acid (e.g., —COOH) and/or carboxylate (e.g., —COO⁻) species after the pH of the carrier fluid (e.g., an aqueous fluid present in the CORS) increases to a certain value (e.g., a pH value from about 2 to about 4) due to fluid interactions with the formation surfaces or scale deposits (e.g., a pH increasing compound, such as for example $CaCO_3$, present in the formation and/or scale deposits gets solubilized in the carrier fluid, thereby increasing the pH of the carrier fluid).

In an embodiment, the carboxylic acid (e.g., —COOH) and/or carboxylate (e.g., —COO⁻) functionalities of the chelating agent may be protected with any suitable protective group, such as for example an ester, an amide, an anhydride, or combinations thereof, to form the precursor compound in order to delay the release of the carboxylic acid (e.g., —COOH) and/or carboxylate (e.g., —COO⁻) species. Without wishing to be limited by theory, a protective group is meant to temporarily inhibit the function (e.g., chelation) of the functional group (e.g., carboxylic acid (e.g., —COOH) and/or carboxylate (e.g., —COO⁻) species) it is protecting; the function (e.g., chelation) of the functional group (e.g., carboxylic acid (e.g., —COOH) and/or carboxylate (e.g., —COO⁻) species) may be restored by removing the protective group by using any suitable methodology.

In an embodiment, the chelating agent precursor comprises an ester. Hereinafter, for simplicity, the remainder of the disclosure will focus on the use of an ester as the chelating agent precursor with the understanding that other chelating agent precursors may be used in various embodiments. In an embodiment, one or more carboxylic groups of the chelating agent characterized by Structures II through VII may be protected with an ester group to delay the release of the carboxylic acid (e.g., —COOH) and/or carboxylate (e.g., —COO⁻) species. Non-limiting examples of esters suitable for use in the present disclosure include aliphatic esters, methyl esters, ethyl esters, propyl esters, butyl esters, t-butyl esters; aromatic esters, benzyl esters; silyl esters, trimethylsilyl esters, triethylsilyl esters, dimethylisopropylsilyl esters, diethylisopropylsilyl esters, t-butyldimethylsilyl esters, t-butyldiphenylsilyl esters, triisopropylsilyl esters, and the like, or combinations thereof. The ester may be converted to a carboxylic acid (e.g., —COOH) and/or carboxylate (e.g., —COO⁻) species by hydrolysis of the ester linkage, for example by contact with water present in the aqueous fluid of the CORS and/or water present in situ in the wellbore. It will be appreciated by one of ordinary skill in the art and with the help of this disclosure that the presence of different ester protective groups in a chelating agent will allow for releasing of different carboxylic acid (e.g., —COOH) and/or carboxylate (e.g., —COO⁻) species at different times.

In an embodiment, the chelating agent precursor may be characterized as exhibiting a suitable delay time. As used herein, the term "delay time" refers to the period of time from when a chelating agent precursor, or a combination of chelating agent precursors, is introduced into an operational environment until the chelating agent precursor or combination of precursors has degraded a sufficient degree to alter (i.e., begin to degrade) the scale deposits, as will be disclosed herein. As will be appreciated by one of skill in the art viewing this disclosure, differing chelating agent precursors may exhibit varying delay times. As such, in an embodiment, a chelating agent precursor, or combination of chelating agent precursors, may be selected for inclusion in a wellbore servicing fluid such that the chelating agent precursor(s) exhibit a desired average delay time. In an embodiment, the chelating agent precursor may exhibit an average delay time of at least about 1 hour, alternatively at least about 2 hours, alternatively at least about 4 hours, alternatively at least about 8 hours, alternatively at least about 12 hours, or alternatively at least about 24 hours.

In an embodiment, the chelating agent precursor may be characterized as operable within a suitable temperature range. As will be appreciated by one of skill in the art viewing this disclosure, differing chelating agent precursors may exhibit varying temperature ranges of operability. As such, in an embodiment, a chelating agent precursor, or combination of chelating agent precursors, may be selected for inclusion in the wellbore servicing fluid such that the chelating agent precursor(s) exhibit a user and/or process-desired operable temperature range (e.g., an ambient downhole temperature for a given wellbore). In addition, as will also be appreciated by one of skill in the art viewing this disclosure, the degradation of the chelating agent precursor may be influenced by the temperature of the operational environment. For example, the rate of degradation of a given chelating agent precursor may generally be higher at higher temperatures. As such, the rate of degradation of a given chelating agent precursor may be generally higher when exposed to the environment within the wellbore as compared to the temperature at the surface of the wellbore. In an embodiment, the chelating agent precursor may exhibit an operable temperature range of from about 20° C. to about 200° C., alternatively from about 30° C. to about 190° C., or alternatively from about 40° C. to about 180° C.

In an embodiment, the chelating agent precursor may be included within the CORS in a suitable amount. The concentration of the chelating agent precursor within the CORS may be selected to achieve a given concentration of chelating agent upon degradation of the chelating agent precursor. In an embodiment, the chelating agent precursor may be included within the CORS in amount suitable or effective to provide a corresponding suitable or effective amount of chelating agent upon degradation (e.g., an amount effective to reduce/eliminate a desired amount of scale from a surface). The resultant concentration and/or amount of chelating agent precursor that is necessary may be dependent upon a variety of factors such as the composition of the aqueous base fluid, the presence or absence of various additives; the composition of the scale; the thickness of the scale; the temperature of the operational environment (e.g., the wellbore); the composition of the formation, the pressure of the formation, the diameter of the hole, the particular chelating agent precursor used, the expected contact time of the generated chelating agent with the formation; the desired amount of time necessary for removal of the scale; or combinations thereof.

In an embodiment, a chelating agent precursor suitable for use in the present disclosure may be used in an environment that has a pH value of from about 0 to about 12, alternatively from about 0.5 to about 7, or alternatively from about 1 to about 5.

In an embodiment the chelating agent precursor is present within the CORS in an amount of from about 1 wt. % to about 50 wt. %, alternatively from about 5 wt. % to about 30 wt. %, or alternatively from about 10 wt. % to about 20 wt. %, based on the total weight of the CORS.

In an embodiment, the CORS comprises a chelating agent precursor having a hydrolysable moiety (e.g., ester) as the operable functionality. In such an embodiment, the CORS may optionally comprise a rate adjustment material (RAM), which functions to adjust the hydrolysis rate of the chelating agent precursor.

The particular combinations of a RAM and a chelating agent precursor suitable for use in a CORS may be formulated by one of ordinary skill in the art with the benefits of this disclosure to produce a desired effect or profile (e.g., chelating agent release profile) at or over a period of time. Such release profiles may include a steady increase or decrease in release rate (i.e., constant slope), exponential increase or decrease in release rate, step-wise increases or decreases in release rates, maximums and/or minimums in release rate (e.g., bell-shaped profiles), and combinations thereof. In an embodiment, the RAM and chelating agent precursor may be included within the CORS in amount suitable or effective to provide a corresponding suitable or effective amount of chelating agent upon degradation (e.g., an amount effective to reduce/eliminate a desired amount of scale from a surface).

In an embodiment, the RAM comprises one or more pH-lowering materials (e.g., acids or acidic materials). For example, the RAM may comprise small amounts of one or more reactive materials (e.g., acids, mineral acids, organic acids, acidic anhydrides, p-toluenesulfonic acid) that decrease the pH and accelerate the hydrolysis of the chelating agent precursors. In other embodiments, the RAM comprises one or more pH increasing materials (e.g., bases or basic materials). For example, in some instances, such as with ortho esters, the hydrolysis rate may be slowed by the addition of a small amount of a strong base such as NaOH, $Na_2CO_3$, $NaHCO_3$ and $Mg(OH)_2$ or organic bases such as ethanolamine or other aliphatic or aromatic amine type compounds. Additional disclosure of RAMs suitable for use with the present disclosure can be found in U.S. Pat. No. 7,906,464, which is incorporated by reference herein in its entirety.

In an embodiment, the RAM may be included within the CORS in a suitable amount. In an embodiment a RAM of the type disclosed herein may be present within the CORS in an amount of from about 1 wt. % to about 10 wt. %, alternatively from about 1.5 wt. % to about 5 wt. %, or alternatively from about 1.5 wt. % to about 3 wt. %, based on the total weight of the CORS.

Aqueous base fluids that may be used in the CORS include any aqueous fluid suitable for use in subterranean applications, provided that the aqueous base fluid is compatible with the chelating agent, chelating agent precursor, and/or RAM used in the CORS. For example, the CORS may comprise water or a brine. In an embodiment, the base fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, produced water, or combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an embodiment, the salt or salts in the water may be present within the base fluid in an amount sufficient to yield a saturated brine. In an embodiment, the aqueous fluid comprises an about 1 M (molar) equivalent brine, when the CORS is intended for use in a formation comprising sandstone comprising swelling clays (e.g., smectite), to avoid damaging such formation. In an embodiment, the aqueous fluid comprises a CLA-WEB agent aqueous solution, wherein the CLA-WEB agent is present in an effective concentration (e.g., a concentration of about 0.5% by weight). CLA-WEB agent is a clay damage control additive commercially available from Halliburton Energy Services.

Nonlimiting examples of aqueous brines suitable for use in the present disclosure include chloride-based, bromide-based, or formate-based brines containing monovalent cations. In an embodiment, the brine comprises monovalent cations. Additional examples of suitable brines include, but are not limited to: NaCl, NaBr, KCl, ammonium chloride ($NH_4Cl$), sodium formate, potassium formate, cesium formate, or combinations thereof. In an embodiment, the aqueous fluid comprises a brine. The brine may be present in an amount of from about 0.1 wt. % to about 30 wt. %, alternatively from about 1 wt. % to about 15 wt. %, or alternatively from about 2 wt. % to about 10 wt. %, based on the total weight of the CORS. Alternatively, the aqueous fluid may comprise the balance of the CORS after considering the amount of the other components used.

In an embodiment, the CORS may optionally comprise one or more additives or additional components, as may be suitable depending upon the end use of the CORS. Such additives may include, but are not limited to, acids, bases, surfactants, corrosion inhibitors, mutual solvents, other biodegradable chelants, silica scale polymerization inhibitors, or combinations thereof. As will appreciated by one of skill in the art with the help of this disclosure, any of the components and/or additives used in the CORS have to be compatible with the chelating agent and/or chelating agent precursor used in the CORS composition. In an embodiment, acids and/or bases may be used for adjusting the pH of the CORS such that predetermined carboxylic acid groups of the chelating agent may be in the anionic carboxylate form (i.e., $-COO^-$), while other carboxylic acid groups of the chelating agent may be in the protonated form (i.e., $-COOH$), as previously described herein. Furthermore, acids and/or bases may function as a RAM in the CORS, for example in the presence of a chelating agent precursor having a hydrolysable moiety (e.g., ester).

In an embodiment, the CORS comprises an acid. In an embodiment, an acid may be used for decreasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of acids suitable for use in the present disclosure include formic acid; acetic acid; monochloroacetic acid; dichloroacetic acid; trichloroacetic acid; hydrochloric acid; nitric acid; sulphuric acid; sulphonic acid; sulphinic acid; methanesulfonic acid; sulphamic acid; and, if necessary, lactic acid, glycolic acid, oxalic acid, propionic acid, butyric acid; or combinations thereof.

In an embodiment, the CORS excludes hydrofluoric acid. In an embodiment, the CORS does not contain a material amount of hydrofluoric acid. In an embodiment, the CORS comprises hydrofluoric acid in an amount of less than about 0.01 wt. %, alternatively less than about 0.001 wt. %, alternatively less than about 0.0001 wt. %, alternatively less than about 0.00001 wt. %, or alternatively less than about 0.000001 wt. %, based on the total weight of the CORS.

In an embodiment, the acid may be included within the CORS in any suitable amount necessary to adjust the pH of the CORS to a particular pH value (e.g., a target pH), such as for example a pH value of about 0, about 1, about 2, about 3, about 4, about 5, etc.

In an embodiment, the CORS comprises a surfactant. The surfactant may function to improve the compatibility of the CORS with other fluids (e.g., formation fluids) that may be present in the subterranean formation and/or to enhance contact of the CORS with one or more scaled surfaces. In an embodiment, a surfactant may be used to enhance the reactivity of the CORS by, for example, breaking any emulsions present from the drilling fluid system or improving the interfacial interactions between the scale deposit and the CORS thereby allowing the CORS to contact the scale deposit more easily. Nonlimiting examples of surfactants suitable for use in the CORS include ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, trimethylcocoammonium chloride, or combinations thereof.

Commercial examples of surfactants that may be suitable for use in the present disclosure include without limitation CFS-485 casing cleaner, LOSURF-300M surfactant, LOSURF-357 surfactant, LOSURF-360 surfactant, LOSURF-400 surfactant, LOSURF-2000S surfactant, LOSURF-2000M surfactant, LOSURF-259 nonemulsifier, and NEA-96M surfactant. CFS-485 casing cleaner is a blend of surfactants and alcohols; LOSURF-300M surfactant is a nonionic surfactant; LOSURF-357 surfactant is a nonionic liquid surfactant; LOSURF-360 surfactant is a nonionic surfactant; LOSURF-400 surfactant is a nonionic surfactant; LOSURF-2000S surfactant is a blend of an anionic nonemulsifier and an anionic hydrotrope; LOSURF-2000M surfactant is a solid surfactant; LOSURF-259 nonemulsifier is a nonionic, nonemulsfier blend; and NEA-96M surfactant is a general surfactant and nonemulsifier; all of which are available from Halliburton Energy Services, Inc. of Houston, Tex.

Surfactants suitable for use in the present disclosure are described in more detail in U.S. Pat. No. 7,992,656, which is incorporated by reference herein in its entirety. In an embodiment, the surfactants may be present in the CORS in an amount sufficient to prevent incompatibility with formation fluids or wellbore fluids. In an embodiment, where liquid surfactants are used, the surfactants may be present in an amount of from about 0.1 wt. % to about 5 wt. %, alternatively from about 0.5 wt. % to about 4 wt. %, or alternatively from about 1 wt. % to about 3 wt. %, based on the total weight of the CORS. In an embodiment, where powdered surfactants are used, the surfactants may be present in an amount in the range of from about 0.01 wt. % to about 1 wt. %, alternatively from about 0.05 wt. % to about 0.5 wt. %, or alternatively from about 0.1 wt. % to about 0.3 wt. %, based on the total weight of the CORS.

In some embodiments, it may be beneficial to add a surfactant to the CORS as it is being pumped downhole, inter allia, to help reduce the possibility of forming emulsions with the formation crude oil or injection fluids. In some embodiments, microemulsion additives optionally may be included in the CORS. Nonlimiting examples of emulsion-minimizing surfactants and microemulsion additives suitable for use in the present disclosure include PEN-88M surfactant, PEN-88HT surfactant, SSO-21E surfactant, SSO-21MW agent, and GASPERM 1000 service. PEN-88M surfactant is a nonionic penetrating surfactant; PEN-88HT surfactant is a high-temperature surfactant; SSO-21E surfactant is a foaming surfactant; SSO-21MW agent is a foaming surfactant and GASPERM 1000 service is a microemulsion; all of which are commercially available from Halliburton Energy Services, Inc.

In an embodiment, the CORS comprises a corrosion inhibitor. Without wishing to be limited by theory, a corrosion inhibitor is generally a chemical compound that may function to decrease (e.g., reduce, slow down, or lessen) the corrosion rate of a material, such as a metal or an alloy, typically by forming a coating, often a passivation layer, which prevents access of the corrosive substance to the metal or alloy.

In an embodiment, the corrosion inhibitor comprises a quaternary ammonium compound; unsaturated carbonyl compounds, 1-phenyl-1-ene-3-butanone, cinnamaldehyde; unsaturated ether compounds, 1-phenyl-3-methoxy-1-propene; unsaturated alcohols, acetylenic alcohols, methyl butynol, methyl pentynol, hexynol, ethyl octynol, propargyl alcohol, benzylbutynol, ethynylcyclohexanol; Mannich condensation products (such as those formed by reacting an aldehyde, a carbonyl containing compound and a nitrogen containing compound); condensation products formed by reacting an aldehyde in the presence of an amide; polysaccharides, inulin, tannins, tannic acid, catechin, epicatechin, epigallocatechin, epicatechingallate; formamide, formic acid, formates; other sources of carbonyl; iodides; fluorinated surfactants; quaternary derivatives of heterocyclic nitrogen bases; quaternary derivatives of halomethylated aromatic compounds; terpenes; aromatic hydrocarbons; coffee, tobacco, gelatin; derivatives thereof, and the like, or combinations thereof. Corrosion inhibitors suitable for use in the present disclosure are described in more detail in U.S. Pat. Nos. 3,077,454; 5,697,443; 7,621,334; U.S. Publication Nos. 2012/0238479 A1, 2012/0142563 A1, and 2012/0145401 A1, each of which is incorporated by reference herein in its entirety.

In an embodiment, the corrosion inhibitor comprises a quaternary ammonium compound of the general formula $(R)_4N^+X^-$, wherein the R groups represent the same or different long chain alkyl, cycloalkyl, aryl or heterocyclic groups and X represents an anion, such as for example a halide. In an embodiment, the corrosion inhibitor comprises an N-alkyl, N-cyclohexyl or N-aryl pyridinium or quinolinium compound. Nonlimiting examples of quaternary ammonium compounds suitable for use in the present disclosure include N-alkyl, N-cycloalkyl and N-alkylaryl pyridinium halides, such as N-cyclohexylpyridinium bromide, N-octylpyridinium bromide, N-nonylpyridinium bromide, N-decylpyridinium bromide, N-dodecylpyridinium bromide, N,N-didodecyldipyridinium dibromide, N-tetradecylpyridinium bromide, N-laurylpyridinium chloride, N-dodecylbenzylpyridinium chloride, N-dodecylquinolinium bromide, N-(1-methylnapthyl)quinolinium chloride, N-benzyl)quinolinium chloride, monochloromethylated and bischloromethylated pyridinium halides; ethoxylated and propoxylated quaternary ammonium compounds, sulfated ethoxylates of alkyl phenols and primary and secondary fatty alcohols, didodecyldimethylammonium chloride, hexadecylethyldimethylammonium chloride, 2-hydroxy-3-(2-undecylamidoethylamino)-propane-1-triethylammonium hydroxide, 2-hydroxy-3-(2-heptadecylamidoethylamino)-propane-1-triethylammonium hydroxide, 2-hydroxy-3-(2-heptadecylamidoethylamino)-propane-1-triethylammonium hydroxide, and the like, or combinations thereof.

Nonlimiting examples of commercially available corrosion inhibitors suitable for use in the present disclosure include MSA-II corrosion inhibitor, MSA-III corrosion inhibitor, HAI-25E+ environmentally friendly low temp corrosion inhibitor, HAI-404 acid corrosion inhibitor, HAI-50 inhibitor, HAI-60 corrosion inhibitor, HAI-62 acid corrosion inhibitor, HAI-65 corrosion inhibitor, HAI-72E+ corrosion inhibitor, HAI-75 high temperature acid inhibitor, HAI-81M acid corrosion inhibitor, HAI-85 acid corrosion inhibitor, HAI-85M acid corrosion inhibitor, HAI-202 environmental corrosion inhibitor, HAI-OS corrosion inhibitor, HAI-GE corrosion inhibitor, FDP-S692-03 corrosion inhibitor for organic acids, FDP-S656AM-02 environmental corrosion inhibitor system and FDP-S656BW-02 environmental corrosion inhibitor system, all of which are available from Halliburton Energy Services, Inc.

In an embodiment, a corrosion inhibitor intensifier may be used with a corrosion inhibitor. A corrosion inhibitor intensifier may function to enhance the activity of the corrosion inhibitor, e.g., decrease further the corrosion rate. Nonlimiting examples of commercially available corrosion inhibitor intensifiers suitable for use in the present disclosure include HII-500 corrosion inhibitor intensifier, HII-500M corrosion inhibitor intensifier, HII-124 acid inhibitor intensifier, HII-124B acid inhibitor intensifier, HII-124C inhibitor intensifier, and HII-124F corrosion inhibitor intensifier, all of which are available from Halliburton Energy Services, Inc.

In an embodiment, the corrosion inhibitor may be included within the CORS in a suitable amount. As will be appreciated by one of skill in the art, and with the help of this disclosure, the amount of corrosion inhibitor necessary for a particular application is highly dependent on a variety of parameters, such as for example temperature and type of metallurgy (e.g., the composition of the equipment that is intended to be protected by such corrosion inhibitor). In an embodiment a corrosion inhibitor of the type disclosed herein may be present within the CORS in an amount of from about 0.05 wt. % to about 3 wt. %, alternatively from about 0.1 wt. % to about 2 wt. %, or alternatively from about 0.0001 wt. % to about 0.01 wt. %, based on the total weight of the CORS.

In an embodiment, the CORS comprises a mutual solvent. Herein a mutual solvent is defined as a material that is soluble in oil, water, and acid-based treatment fluids. Given that the mutual solvent is miscible with more than one class of liquids, such materials can cause two ordinarily immiscible liquids to combine with each other. Nonlimiting examples of mutual solvents suitable for use in the present disclosure include glycol ethers, ethylene glycol monobutylether, propylene glycol monobutylether; methanol; isopropyl alcohol; alcohol ethers; aldehydes; ketones; aromatic solvents; derivatives thereof; and combinations thereof. Nonlimiting examples of commercially available mutual solvents suitable for use in the present disclosure include MUSOL mutual solvent sold by Halliburton Energy Services, Inc., SOL-15 solvent sold by Fracmaster Ltd., and SUPER-SOL solvent sold by Osca.

In an embodiment, the mutual solvent may be included within the CORS in a suitable amount. In an embodiment a mutual solvent of the type disclosed herein may be present within the CORS in an amount of from about 1 wt. % to about 12 wt. %, alternatively from about 3 wt. % to about 10 wt. %, or alternatively from about 4 wt. % to about 8 wt. %, based on the total weight of the CORS.

In an embodiment, the CORS comprises a conventional biodegradable chelant or chelating agent. Nonlimiting examples of conventional biodegradable chelants suitable for use in the present disclosure include L-glutamic acid N,N-diacetic acid, tetra sodium salt (GLDA); methylglycinediacetic acid (MGDA); β-alanine diacetic acid (β-ADA); ethylenediamine-N,N'-disuccinic acid (EDDS); 2-hydroxyethyliminodiacetic acid, disodium salt (HEIDA); or combinations thereof.

In an embodiment, the conventional biodegradable chelant may be included within the CORS in a suitable amount. In an embodiment a conventional biodegradable chelant of the type disclosed herein may be present within the CORS in an amount of from about 1 wt. % to about 10 wt. %, alternatively from about 1.5 wt. % to about 8 wt. %, or alternatively from about 2 wt. % to about 5 wt. %, based on the total weight of the CORS.

In an embodiment, the CORS comprises a silica scale polymerization inhibitor. The silica scale polymerization inhibitor may function to suppress silica scale build-up by increasing the solubility of silica in solution, inhibiting silica polymer chain propagation, and/or decreasing the size or quantity of any silica scale created in a solution. Nonlimiting examples of silica scale polymerization inhibitor suitable for use in the present disclosure include polyaminoamide dendrimers, polyethyleneimine, carboxymethylinulin, polyacrylates, polyallylamines, poly(diallyldimethylammonium chloride), polyacrylamides, copolymers thereof, or combinations thereof. Silica scale polymerization inhibitors are described in more detail in U.S. Publication No. 2012/0172263 A1, which is incorporated by reference herein in its entirety.

In an embodiment, the CORS comprises a chelating agent, an acid, a surfactant, a corrosion inhibitor, a mutual solvent, and a brine. For example, the CORS may comprise 10 wt. % TCA6, 6 wt. % tannic acid, 5 wt. % MUSOL mutual solvent, and the balance comprises a KCl brine with a concentration of 2% by weight or a CLA-WEB agent aqueous solution with a concentration of 0.5% by weight, based on the total weight of the CORS. The acid comprises HCl in an amount suitable for adjusting the pH of the CORS to a value of about 1.

In an alternative embodiment, the CORS comprises a chelating agent precursor, a surfactant, a corrosion inhibitor, a mutual solvent, and a brine. For example, the CORS may comprise 15 wt. % BCA6 precursor (e.g., a BCA6 ester), 1 wt. % cocamidopropyl betaine, 0.15 wt. % MSA-II corrosion inhibitor, 2 wt. % inulin, 5 wt. % isopropyl alcohol, and the balance comprises a KCl brine with a concentration of 2% by weight or a CLA-WEB agent aqueous solution with a concentration of 0.5% by weight, based on the total weight of the CORS.

In an embodiment, the chelating agent comprises, consists essentially of, or consists of TCA6 and/or a TCA6 precursor (e.g., a TCA6 ester). In an embodiment, the chelating agent comprises, consists essentially of, or consists of an amino polyether multicarboxylic acid and/or an amino polyether multicarboxylic acid precursor. In an embodiment, chelating agents of the type described herein are the only chelating agents present in the CORS and are used without any other conventional chelating agents present.

In an embodiment, a method of servicing a wellbore comprises drilling a wellbore in a subterranean formation and introducing to the wellbore and/or surrounding formation a wellbore servicing fluid (WSF). As used herein, a "servicing fluid" refers to a fluid used to drill, complete, work over, fracture, repair, or in any way prepare a wellbore for the recovery of materials residing in a subterranean formation penetrated by the wellbore. The servicing fluid is for use in a wellbore that penetrates a subterranean formation. It is to be understood that "subterranean formation" encompasses both areas below exposed earth and areas below earth covered by water such as ocean or fresh water. Examples of wellbore servicing fluids include, but are not limited to, cement slurries, drilling fluids or muds, spacer fluids, lost circulation fluids, washing fluids, sweeping fluids, fracturing fluids, acidizing fluids or completion fluids.

In an embodiment, a CORS of the type described herein may be used as a stand-alone treatment fluid, may be used as an additive package (e.g., a concentrated additive) to a WSF, and/or may be combined with other components to form a composite WSF, and it is to be understood that herein reference and description of operations, services, and uses of a CORS collectively includes any and all of the foregoing (e.g., a CORS alone or in combination of one or more additional wellbore servicing fluid components). In an embodiment, a WSF comprises a chelating agent and/or chelating agent precursor, aqueous base fluid, and optional additives, such as rate adjustment materials, acids, bases, surfactants, corrosion inhibitors, mutual solvents, etc., of the type described herein. In an embodiment, the WSF is an aqueous based WSF and may contain a suitable or effective amount of a CORS or components thereof (e.g., an amount effective to reduce/eliminate a desired amount of scale from a surface). In an embodiment, the WSF is a CORS, for example an aqueous based CORS. In an alternative embodiment, a first WSF is placed downhole (e.g., in the absence of a CORS) resulting in the formation of scale on a downhole surface (e.g., an equipment surface, a geological surface, etc.), and subsequently a second WSF (e.g., a CORS or a WSF comprising the components of a CORS of the type described herein) is placed downhole to remove/eliminate an amount of the scale.

In an embodiment, the WSF (e.g., a CORS) may be prepared via any suitable method or process. For example, the components of the CORS (e.g., chelating agent, chelating agent precursor, aqueous base fluid, optional additives, such as rate adjustment materials, acids, bases, surfactants, corrosion inhibitors, mutual solvents, etc.) alone or in combination with other WSF additives may be combined using any mixing device compatible with the composition. In an embodiment, the components of the WSF (e.g., a CORS) are combined at the well site; alternatively, the components of the WSF (e.g., a CORS) are combined off-site and are transported to and used at the well site.

As it will be appreciated by one of ordinary skill in the art and with the help of this disclosure, a CORS may be used for the removal of scale in any suitable stage of a wellbore's life, such as for example, during a drilling operation, completion operation, production stage, etc. In an embodiment, the chelating agents and/or chelating agent precursors of the CORS may be used for the removal of scale and/or dissolved metal ions. Nonlimiting examples of metal ions that may be found in the wellbore environment and may contribute to the formation of scale deposits include $Ca^{2+}$, $Mg^{2+}$, $Ba^{2+}$, $Sr^{2+}$, $Fe^{2+}$, $Fe^{3+}$, $Cu^{2+}$, $Ag^+$, $Ni^{2+}$, $Cr^{3+}$ and the like. Deep subsurface water (e.g., formation water) may become enriched with ions by solubilizing the encountered sedimentary minerals. The water in carbonate and calcite-cemented sandstone reservoirs usually contains an abundance of divalent calcium ($Ca^{2+}$) and divalent magnesium ($Mg^{2+}$) cations. Sandstone formation fluids often contain divalent barium ($Ba^{2+}$) and divalent strontium ($Sr^{2+}$) cations. The precise metal ion composition of formation fluids (e.g., formation water) has a complex dependence on mineral diagenesis. Calcium sulfate ($CaSO_4$), calcium carbonate ($CaCO_3$), barium sulfate ($BaSO_4$), strontium sulfate ($SrSO_4$), iron carbonate ($FeCO_3$), iron sulfate ($FeSO_4$), iron hydroxides and silica scale are the most common scales in oil wellbore environments.

In an embodiment, the CORS may be utilized in a drilling and completion operation. In such an embodiment, an aqueous drilling mud by being circulated through the wellbore while the wellbore is drilled in a conventional manner. Debris such as drilling mud and mineral deposits (e.g., scale) left in the wellbore can have an adverse effect on several aspects of a well's completion and production stages, from inhibiting the performance of downhole tools to inducing formation damage and plugging production tubing. As will be appreciated by one of skill in the art viewing this disclosure, as the aqueous drilling fluid is circulated through the wellbore, scale may be deposited on any of the surfaces that the aqueous drilling fluid comes in contact with (e.g., tubing, pipes, valves, formation surface, etc.). Water, such as the base fluid of the drilling fluid, is a good solvent for many materials and can carry large amounts of scaling minerals. All natural waters contain dissolved components acquired through contact with mineral phases in the natural environment, giving rise to complex fluids, rich in ions, and consequently have a high propensity for scale formation. Accordingly, concurrent with and/or subsequent to drilling operations where scale is formed on a downhole surface, a CORS may be placed downhole and contacted with the scale to remove all or a portion thereof. In an alternative embodiment, concurrent with and/or subsequent to drilling operations where scale is formed and/or likely to be formed on a downhole surface, a CORS (or components thereof) may be combined with an aqueous based drilling fluid to prevent/reduce the formation of scale and/or remove all or a portion of existing scale.

In an additional embodiment, the CORS may be utilized in conjunction with a formation evaluation operation such as electronically logging the wellbore. For example, in an embodiment, the wellbore may be evaluated via electronic logging techniques following sufficient contact between the scale and the CORS to remove all or a portion of the scale, as disclosed herein. In such an embodiment, a method of evaluating a formation utilizing a CORS of the type disclosed herein may generally comprise circulating a drilling fluid during a drilling operation (wherein scale is formed during the drilling) and, upon the cessation of drilling operations and/or upon reaching a desired depth, removing the scale deposits from a downhole surface (e.g., a wellbore surface, formation surface, equipment surface, etc.) utilizing a CORS, as disclosed herein. Upon sufficient removal of the scale deposits, logging tools may be run into the wellbore to a sufficient depth to characterize a desired portion of the subterranean formation penetrated by the wellbore.

In an embodiment, when desired (for example, upon the cessation of drilling operations and/or upon reaching a desired depth), the wellbore or a portion thereof may be prepared for completion. In completing the wellbore, it may be desirable to remove all or a substantial portion of the scale from any surfaces where scale might have been deposited, from equipment surface to formation surface.

In an embodiment, the method of using a CORS of the type disclosed herein may comprise completing the wellbore. In such an embodiment, the wellbore, or a portion thereof, may be completed by providing a casing string within the wellbore and cementing or otherwise securing the casing string within the wellbore. In such an embodiment, the casing string may be positioned (e.g., lowered into) the wellbore to a desired depth prior to, concurrent with, or following provision of the CORS and/or removal of the scale deposit. When the scale has been sufficiently degraded and/or removed from the downhole surface (e.g., wellbore surface, equipment/casing surface, formation surface, etc.), the CORS may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been positioned, the cementitious slurry may be allowed to set.

In an embodiment, the CORS may be utilized during the production stage of a wellbore. When the wellbore reaches the production stage, whenever water is produced along with the natural resource (e.g., oil), scale may deposit on any of the surfaces that the produced water comes in contact with (e.g., formation surface, production tubing, etc.). The presence of scale may slow down or completely stop production of the natural resource (e.g., oil), so it may be desirable to perform anther operation of scale removal. Accordingly, a CORS may be placed downhole in association with a production enhancement operation or service, where the CORS is contacted with a downhole surface (e.g., formation surface, wellbore surface, equipment surface, etc.) to remove all or a portion of scale therefrom and thereby increase the rate of production of resources from the well.

In an embodiment, removing the scale may comprise contacting a CORS with the scale, which may have been formed by the circulation of a drilling fluid during a drilling operation, or alternatively by produced water during the production stage. In such an embodiment, a CORS of the type disclosed herein may be placed within the wellbore. In an embodiment, when a sufficient quantity of the CORS has been placed within the wellbore, the CORS may be allowed to remain in contact with the scale for a sufficient period of time such that the chelating agent will remove all or a substantial portion of the scale from any surfaces where scale might have been deposited. In an embodiment, when a sufficient quantity of the CORS has been placed within the wellbore, the CORS may be allowed to remain in contact with the scale for a sufficient period of time that the chelating agent precursor within the CORS will generate a sufficient quantity of chelating agent (e.g., carboxylic acid (i.e., —COOH) and/or carboxylate (i.e., —COO$^-$) species) to chelate the metal ions in the scale. For example, in such an embodiment the CORS may be allowed to remain in contact with the scale for a soak-period, for example, for a period of time of at least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours, or alternatively at least about 100 hours. In an embodiment, during such a "soak period," the fluids within the wellbore may remain in a substantially static state, for example, as opposed to a dynamic state in which circulation may be present. In an embodiment, the wellbore may be shut-in while the CORS remains in contact with the scale deposits.

In an embodiment, removing the scale may comprise contacting a CORS with the scale, wherein the CORS comprises a chelating agent precursor. The contacting of the components of the CORS may initiate hydrolysis of the chelating agent precursor by the aqueous fluid, for example via hydrolysis and dissociation of ester groups present in the precursors. The CORS may be designed so as to produce the chelating agent (e.g., carboxylic acid (i.e., —COOH) and/or carboxylate (i.e., —COO$^-$) species) in situ (e.g., within the wellbore) following placement at some user and/or process-desired location.

A CORS comprising a chelating agent precursor may exhibit a delayed scale removal when compared to a CORS comprising a chelating agent. For example, a CORS comprising a chelating agent precursor may exhibit scale removal that is delayed from about 1 hour to about 100 hours, alternatively equal to or greater than about 2 to about 3 hours, alternatively equal to or greater than about 24 hours, alternatively from equal to or greater than about 2 to about 5 days when compared to a CORS comprising a chelating agent. As noted previously, the extent of the delay may be adjusted by one of ordinary skill in the art with the benefit of this disclosure to meet the needs of the process by adjusting the nature of the precursors used (e.g., compound type, amounts, delaying mechanism employed, etc.) or through the addition of RAMs as described earlier. The CORSs disclosed herein may result in the removal of scale deposits in a time delayed fashion so as to allow for the efficient removal of scale while minimizing damage to the formation or equipment or to allow for other servicing operations. For example, a time delay in removing the scale may provide sufficient time for the CORS to become fully and evenly distributed along a desired section of the wellbore. Such even treatment prevents isolated break-through zones in the scale that may undesirably divert subsequent servicing fluids placed downhole. Also, time delays in removing the scale may allow for subsequent servicing steps such as removing servicing tools from the wellbore. Following treatment with a CORS, further servicing operations may be performed (e.g., completion and/or production operations) as desired or appropriate, as for example in a hydrocarbon-producing well.

In an embodiment, the CORS and methods of using the same disclosed herein may be advantageously employed as a servicing fluid in the performance of one or more wellbore servicing operations. For example, when utilizing a CORS comprising a chelating agent, the pH of the servicing fluid may be anywhere from acidic (e.g., a pH of about 0) to slightly basic (e.g., a pH of about 8). Further, when utilizing a CORS comprising a chelating agent precursor (e.g., an ester of a chelating agent), the pH of the servicing fluid may advantageously be anywhere from acidic (e.g., a pH of about 0) to basic (e.g., a pH of about 12). Conventional chelating agents for wellbore applications are generally designed for use under basic and neutral conditions, and only few other conventional chelants for use in wellbore applications may be used over such an extended pH range (e.g., GLDA, HEDTA, MGDA). Generally, conventional chelating agents are only partially soluble at low pH (e.g., a pH of less than about 3). Some conventional chelating agents (e.g., MGDA and GLDA) have only two protic moieties that have a $pK_a$ below a pH of about 5, and as such there is no conventional chelating agent that has more than 2 dissociating protons and that is compatible with divalent metal cations (e.g., $Ca^{2+}$, $Fe^{2+}$, etc.) and is soluble as the pH increases to values above about 4. Some conventional chelating agents comprising polycarboxylic, alpha-hydroxy, acids may have up to three dissociating protons below a pH of about 6, but the solubility of the complexes formed by such conventional chelating agents with, for instance, $Ca^{2+}$, is very low, limiting their actual use. Citric acid, for example, has three dissociating protons with the corresponding $pK_a$ values of $pK_{a1}$ 3.09; $pK_{a2}$=4.75; and $pK_{a3}$=5.41, but complexes formed by citric acid at pH values above about 4 have limited solubility, a fact that hinders the use of citric acid and similar molecules for dissolving large quantities of scale. In an embodiment, the CORS may be advantageously used in a filtercake removal fluid.

In an embodiment, when a CORS is used for downhole scale removal, after the scale removal process, the pH of the fluid that is flowed back to the surface may not be as low (i.e., may be less acidic) due to a variety of factors, and may advantageously not require neutralizing when flowed back to the surface, than would be the case if a servicing fluid comprising an inorganic acid (e.g., HCl) instead of the CORS for scale removal was pumped into the well bore. For example, a CORS that is introduced into the wellbore for removing the scale deposits may have a pH no lower than about 1 to about 2 and may not require neutralizing when flowed back to the surface, as opposed to conventional acid treatments that may be used for scale removal, in which case the pH of the fluid may be as low as about 0 to about 1 and may require neutralizing when flowed back to the surface. Further, when the CORS encounters and removes a calcium carbonate based scale, for example, the pH of the fluid may advantageously increase, and the fluid may not require neutralizing when flowed back to the surface, thus reducing the costs associated with the disposal of flowback fluids. In an embodiment, utilizing a CORS may advantageously lead to lower corrosion rates of the wellbore equipment (e.g., the equipment which was subjected to a scale removal operation).

In an embodiment, the usage of a CORS comprising a chelating agent and/or a chelating agent precursor allows for improved scale removal. The metal ions from the scale form a complex with the chelating agent, and once the scale is removed off the surface of interest, the metal ions may advantageously remain in a chelated form, thus preventing the possibility that such metal ions may re-precipitate and re-form the scale, which is often a problem when scale deposits are removed by an acidic solution, for example. The metal ions may remain in a chelated form even when the pH of the environment surrounding the chelated metal ions changes, e.g., when the pH shifts from acidic to basic. This may prove especially advantageous when the chelated metal ions are not flowed back to the surface, but may remain in the wellbore environment.

In an embodiment, a CORS comprising a chelating agent and/or a chelating agent precursor may be advantageously used for chelating dissolved metal ions present in the wellbore environment, and as such may prevent scale formation, e.g., precipitation or deposition of such metal ions as salts or hydroxides on various surfaces in the wellbore (e.g., formation surface, equipment surface, etc.). In an embodiment, the usage of a CORS may advantageously pose a lower risk of formation damage due to the ability of the CORS to effectively chelate $Fe^{3+}$ ions, for example.

In an embodiment, when utilizing a CORS comprising a chelating agent precursor, the CORS may be advantageously placed deeper into the wellbore (e.g., when compared to a CORS comprising a chelating agent as opposed to a chelating agent precursor), before the chelating agent precursor provides the chelating agent for removing the scale.

In an embodiment, a chelating agent and/or a chelating agent precursor of the CORS may advantageously have improved biodegradability, and a lower environmental impact, when compared to conventional chelants, such as ethylenediaminetetraacetic acid (EDTA). Without wishing to be limited by theory, the biodegradability of a chemical compound refers to the ability of such compound to undergo a process of chemical dissolution by microorganisms, such as bacteria, or other biological means. In an embodiment, a chelating agent and/or a chelating agent precursor suitable for use in the present disclosure provides at least 60% biodegradability in 28 days as determined in accordance with method OECD 301B, alternatively at least 65%, 70%, 75%, 80%, 90% or 100%. OECD 301B is a ready biodegradation test developed by the Organization for Economic Cooperation and Development (OECD) for assessing the biodegradability of materials (e.g., chemical compounds) in solution by respirometry based on $CO_2$ evolution. Ready biodegradation tests are aerobic screening tests designed so that positive results are unequivocal and lead to an assumption that the test substance will undergo rapid and complete degradation in the environment. Biodegradability of chemical compounds is described in more detail in Chem. Rev., 2009, vol. 107, p. 2207-2227, which is incorporated by reference herein in its entirety. In an embodiment, a CORS of the type disclosed herein may advantageously display a toxicity level that is sufficiently low to meet one or more HSE guidelines. Additional advantages of using a CORS of the type described herein may be apparent to one of skill in the art viewing this disclosure.

ADDITIONAL DISCLOSURE

The following enumerated embodiments are provided as non-limiting examples.

A first embodiment, which is a method of servicing a wellbore in a subterranean formation comprising preparing a wellbore servicing fluid comprising an amino polyether multicarboxylic acid chelating agent and/or an amino polyether multicarboxylic acid chelating agent precursor, and an aqueous base fluid; and contacting the wellbore servicing fluid with scale deposits on a surface in the wellbore and/or subterranean formation.

A second embodiment, which is the method of the first embodiment wherein the chelating agent comprises an amino polyether compound characterized by Structure I comprising one nitrogen atom and at least 5 chelation sites:

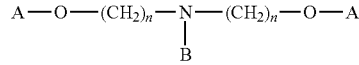

Structure I wherein A and B can each independently be hydrogen, a $C_1$-$C_4$ alkyl group, a carboxylic acid containing moiety, —$CH_2$—COOH,

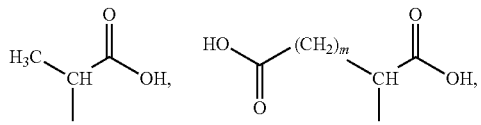

or combinations thereof.

A third embodiment, which is the method of the second embodiment wherein the compound characterized by Structure I comprises an amino polyether multicarboxylic acid.

A fourth embodiment, which is the method of the third embodiment wherein the amino polyether multicarboxylic acid comprises N-tris[2-(1,2-dicarboxyethoxy)ethyl]amine (i.e., TCA6 characterized by Structure II), N-bis[2-(carboxymethoxy)ethyl]glycine (i.e., BCA3 characterized by Structure III), N-bis[2-(1,2-dicarboxyethoxy)ethyl]glycine (i.e., BCA5 characterized by Structure IV), N-bis[2-(1,2-dicarboxyethoxy)ethyl]aspartic acid (i.e., BCA6 characterized by Structure V), N-bis[2-(methylcarboxymethoxy)ethyl]glycine (i.e., MBCA3 characterized by Structure VI), N-bis[2-(1,2-dicarboxyethoxy)ethyl]methylglycine (i.e., MBCA5 characterized by Structure VII), or any combinations thereof

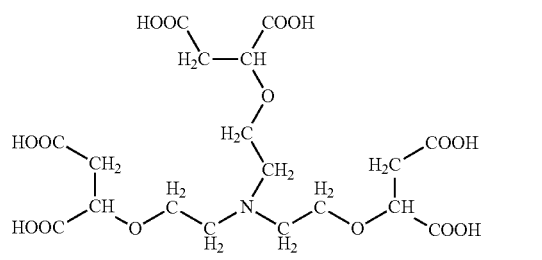

Structure II

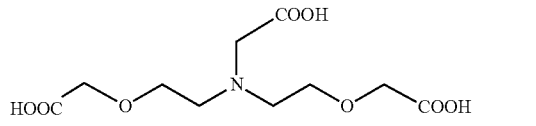

Structure III

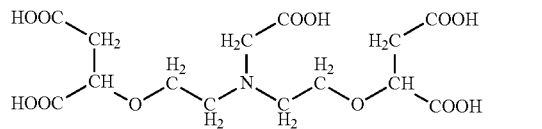

Structure IV

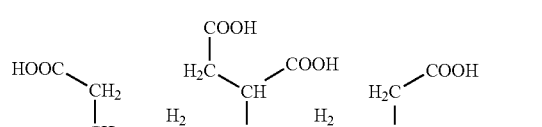

Structure V

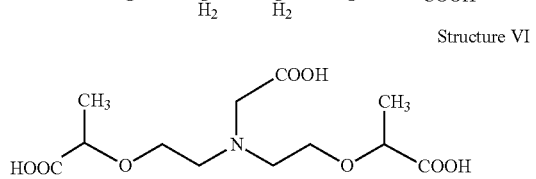

Structure VI

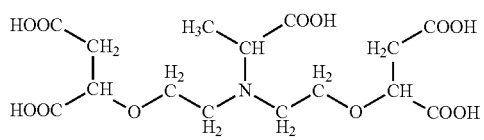

Structure VII

A fifth embodiment, which is the method of one of the first through the fourth embodiments wherein the chelating agent precursor comprises an ester, an amide and/or an anhydride of at least one carboxylic acid group of an amino polyether multicarboxylic acid characterized by Structure I comprising one nitrogen atom and at least 5 chelation sites.

A sixth embodiment, which is the method of the fifth embodiment wherein the ester comprises aliphatic esters, methyl esters, ethyl esters, propyl esters, butyl esters, t-butyl esters; aromatic esters, benzyl esters; silyl esters, trimethylsilyl esters, triethylsilyl esters, dimethylisopropylsilyl esters, diethylisopropylsilyl esters, t-butyldimethylsilyl esters, t-butyldiphenylsilyl esters, triisopropylsilyl esters, and the like, or combinations thereof.

A seventh embodiment, which is the method of one of the first through sixth embodiments wherein the chelating agent and/or the chelating agent precursor is present in the wellbore servicing fluid in an amount of from about 1 wt. % to about 50 wt. %, based on the total weight of the wellbore servicing fluid.

An eighth embodiment, which is the method of one of the first through seventh embodiments wherein the aqueous base fluid comprises a brine.

A ninth embodiment, which is the method of the eighth embodiment wherein the brine is present in the wellbore servicing fluid in an amount of from about 0.1 wt. % to about 30 wt. %, based on the total weight of the wellbore servicing fluid.

A tenth embodiment, which is the method of one of the first through ninth embodiments wherein the composition comprises a chelating agent and the wellbore servicing fluid has a pH of less than about 8.

An eleventh embodiment, which is the method of one of the first through tenth embodiments wherein the composition comprises a chelating agent precursor and the wellbore servicing fluid has a pH of from about 0 to about 12.

A twelfth embodiment, which is the method of one of the first through eleventh embodiments wherein the wellbore servicing fluid optionally comprises a rate adjustment material, an acid, a base, a surfactant, a corrosion inhibitor, a mutual solvent, or combinations thereof.

A thirteenth embodiment, which is the method of one of the first through twelfth embodiments wherein the wellbore servicing fluid comprises an acidizing fluid.

A fourteenth embodiment, which is a method of servicing a wellbore in a subterranean formation comprising preparing a wellbore servicing fluid comprising an amino polyether multicarboxylic chelating agent precursor and an aqueous base fluid; and contacting the wellbore servicing fluid with scale deposits on a surface in the wellbore and/or subterranean formation.

A fifteenth embodiment, which is the method of the fourteenth embodiment wherein the chelating agent precursor comprises an ester, an amide and/or an anhydride of at least one carboxylic acid group of an amino polyether multicarboxylic acid characterized by Structure I comprising one nitrogen atom and at least 5 chelation sites:

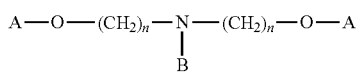

Structure I wherein A and B can each independently be hydrogen, a $C_1$-$C_4$ alkyl group, a carboxylic acid containing moiety, —$CH_2$—COOH,

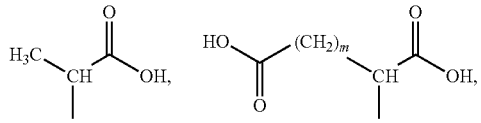

or combinations thereof.

A sixteenth embodiment, which is the method of the fifteenth embodiment wherein the amino polyether multicarboxylic acid comprises N-tris[2-(1,2-dicarboxyethoxy)ethyl]amine (i.e., TCA6 characterized by Structure II), N-bis[2-(carboxymethoxy)ethyl]glycine (i.e., BCA3 characterized by Structure III), N-bis[2-(1,2-di carboxyethoxy)ethyl] glycine (i.e., BCA5 characterized by Structure IV), N-bis[2-(1,2-dicarboxyethoxy)ethyl]aspartic acid (i.e., BCA6 characterized by Structure V), N-bis[2-(methylcarboxymethoxy)ethyl]glycine (i.e., MBCA3 characterized by Structure VI), N-bis[2-(1,2-di carboxyethoxy)ethyl]methyl glycine (i.e., MBCA5 characterized by Structure VII), or any combinations thereof.

Sructure II

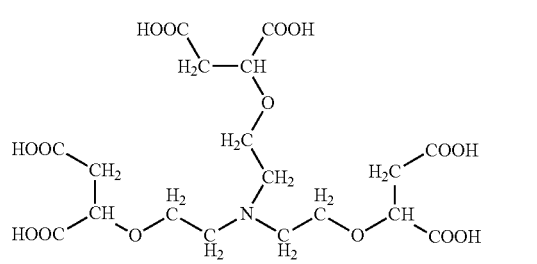

Structure III

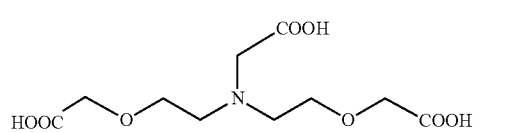

Structure IV

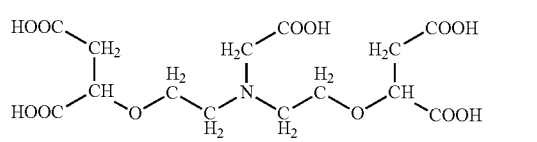

Structure V

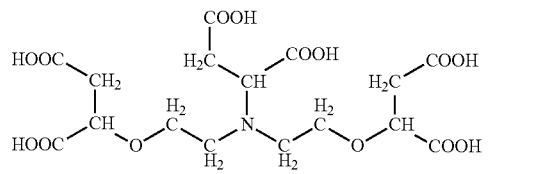

Structure VI

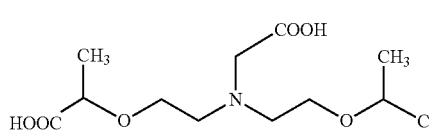

Structure VII

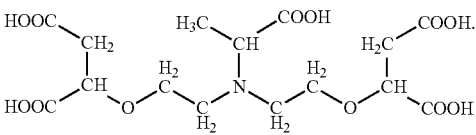

A seventeenth embodiment, which is the method of the sixteenth embodiment wherein the ester comprises aliphatic esters, methyl esters, ethyl esters, propyl esters, butyl esters, t-butyl esters; aromatic esters, benzyl esters; silyl esters, trimethylsilyl esters, triethylsilyl esters, dimethylisopropylsilyl esters, diethylisopropylsilyl esters, t-butyldimethylsilyl esters, t-butyldiphenylsilyl esters, triisopropylsilyl esters, and the like, or combinations thereof.

An eighteenth embodiment, which is the method of one of the fourteenth through seventeenth embodiments wherein the chelating agent precursor is present in the wellbore servicing fluid in an amount of from about 1 wt. % to about 50 wt. %, based on the total weight of the composition.

A nineteenth embodiment, which is the method of one of the fourteenth through eighteenth embodiments wherein the wellbore servicing fluid has a pH of from about 0 to about 12.

A twentieth embodiment, which is the method of one of the fourteenth through nineteenth embodiments wherein the wellbore servicing fluid optionally comprises a rate adjustment material, an acid, a base, a surfactant, a corrosion inhibitor, a mutual solvent, or combinations thereof.

A twenty-first embodiment, which is a scale-removing wellbore servicing fluid comprising an amino polyether multicarboxylic acid chelating agent and/or an amino polyether multicarboxylic acid chelating agent precursor, and an aqueous base fluid.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
preparing a wellbore servicing fluid comprising an aqueous base fluid and at least one of an amino polyether multicarboxylic acid chelating agent and an amino polyether multicarboxylic acid chelating agent precursor wherein the aqueous base fluid comprises a brine, wherein the brine is present in the wellbore servicing fluid in an amount of from about 0.1 wt. % to about 30 wt. %, based on the total weight of the wellbore servicing fluid, wherein the chelating agent comprises an amino polyether compound characterized by Structure I comprising one nitrogen atom and at least 5 chelation sites:

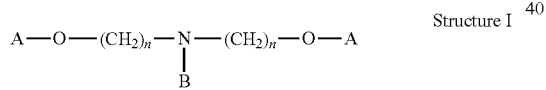

Structure I wherein n is from about 1 to about 10 and A and B are independently selected from the group consisting of: hydrogen; a $C_1$-$C_4$ alkyl group; a carboxylic acid containing moiety; —$CH_2$—COOH;

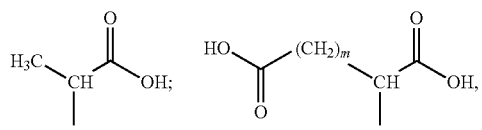

wherein m is from about 1 to about 6; and any combination thereof; and
contacting scale deposits on a surface in at least one of the wellbore and subterranean formation with the wellbore servicing fluid.

2. The method of claim 1, wherein the amino polyether multicarboxylic acid chelating agent is selected from the group consisting of: N-tris[2-(1,2-dicarboxyethoxy)ethyl]amine (i.e., TCA6 characterized by Structure II), N-bis[2-(carboxy-methoxy)ethyl]glycine (i.e., BCA3 characterized by Structure III), N-bis[2-(1,2-dicarboxy-ethoxy)ethyl]glycine (i.e., BCA5 characterized by Structure IV), N-bis[2-(1,2-dicarboxy-ethoxy)ethyl]aspartic acid (i.e., BCA6 characterized by Structure V), N-bis[2-(methylcarboxy-methoxy)ethyl]glycine (i.e., MBCA3 characterized by Structure VI), N-bis[2-(1,2-dicarboxy-ethoxy)ethyl]methylglycine (i.e., MBCA5 characterized by Structure VII), and any combination thereof.

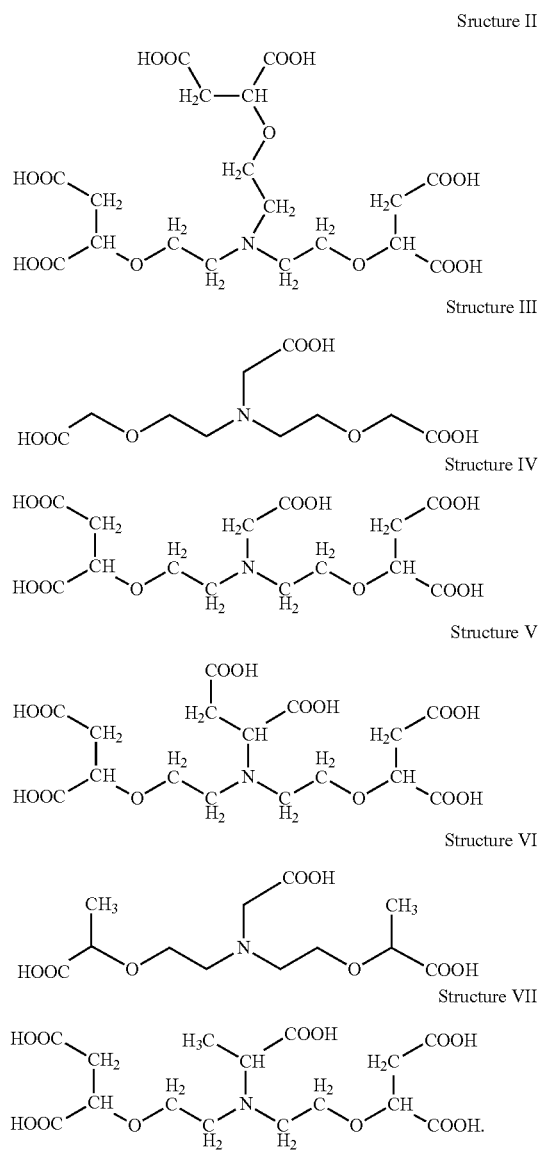

3. The method of claim 1, wherein the chelating agent precursor is selected from the group consisting of: an ester, an amide, an anhydride of at least one carboxylic acid group of an amino polyether multicarboxylic acid characterized by Structure I comprising one nitrogen atom and at least 5 chelation sites, and any combination thereof.

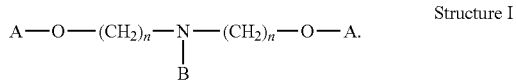

Structure I

4. The method of claim 3, wherein the ester is selected from the group consisting of: an aliphatic ester, a methyl ester, an ethyl ester, a propyl ester, a butyl ester, a t-butyl ester; an aromatic ester, a benzyl ester; a silyl ester, a trimethylsilyl ester, a triethylsilyl ester, a dimethylisopropylsilyl ester, a diethylisopropylsilyl ester, a t-butyldimethylsilyl ester, a t-butyldiphenylsilyl ester, a triisopropylsilyl ester, and the like, and any combination thereof.

5. The method of claim 1, wherein at least one of the chelating agent and the chelating agent precursor is present in the wellbore servicing fluid in an amount of from about 1 wt. % to about 50 wt. %, based on the total weight of the wellbore servicing fluid.

6. The method of claim 1, wherein the wellbore servicing fluid comprises the amino polyether multicarboxylic acid chelating agent and the wellbore servicing fluid has a pH of less than about 8.

7. The method of claim 1, wherein the wellbore servicing fluid comprises the amino polyether multicarboxylic acid chelating agent precursor and the wellbore servicing fluid has a pH of from about 0 to about 12.

8. The method of claim 1, wherein the wellbore servicing fluid comprises at least one component selected from the group consisting of: a rate adjustment material, an acid, a base, a surfactant, a corrosion inhibitor, a mutual solvent, and any combination thereof.

9. The method of claim 1, wherein the wellbore servicing fluid comprises an acidizing fluid.

10. A method of servicing a wellbore in a subterranean formation comprising:
preparing a wellbore servicing fluid comprising an aqueous base fluid and an amino polyether multicarboxylic acid chelating agent precursor selected from the group consisting of: an ester, an amide, an anhydride of at least one carboxylic acid group of an amino polyether multicarboxylic acid characterized by Structure I comprising one nitrogen atom and at least 5 chelation sites, and any combination thereof:

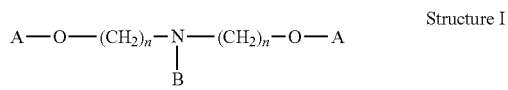

Structure I wherein n is from about 1 to about 10 and A and B are independently selected from the group consisting of: hydrogen; a $C_1$-$C_4$ alkyl group; a carboxylic acid containing moiety; —$CH_2$—COOH;

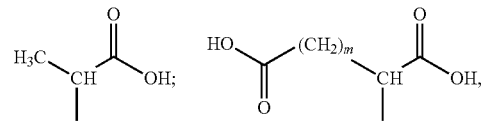

wherein m is from about 1 to about 6; and any combination thereof; and
contacting scale deposits on a surface in at least one of the wellbore and subterranean formation with the wellbore servicing fluid.

* * * * *